United States Patent
Onggosanusi et al.

(10) Patent No.: US 9,641,443 B2
(45) Date of Patent: *May 2, 2017

(54) MIMO PGRC SYSTEM AND METHOD

(71) Applicant: TEXAS INSTRUMENTS INCORPORATED, Dallas, TX (US)

(72) Inventors: Eko N. Onggosanusi, Allen, TX (US); Anand G. Dabak, Plano, TX (US); Timothy M. Schmidl, Dallas, TX (US); Badri Varadarajan, Mountain View, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/050,227

(22) Filed: Feb. 22, 2016

(65) Prior Publication Data
US 2016/0173391 A1 Jun. 16, 2016

Related U.S. Application Data

(63) Continuation of application No. 11/418,661, filed on May 5, 2006, now Pat. No. 9,270,410, and a
(Continued)

(51) Int. Cl.
*H04L 12/833* (2013.01)
*H04W 24/08* (2009.01)
(Continued)

(52) U.S. Cl.
CPC ....... *H04L 47/2458* (2013.01); *H04B 7/0691* (2013.01); *H04B 7/0697* (2013.01);
(Continued)

(58) Field of Classification Search
CPC . H04L 1/0009; H04L 1/0003; H04L 27/2601; H04L 1/009; H04L 1/003;
(Continued)

(56) References Cited

U.S. PATENT DOCUMENTS 5,010,558 A 4/1991 Yost et al.
5,940,402 A 8/1999 Krakovyak
(Continued)

OTHER PUBLICATIONS

Esmailzadeh, Riaz, Doi, Nobukazu, "A Comparison on the Performance of the FDD and TDD Modes of B-CDMA Communications", Nov. 6-10, 1995, IEEE, Universal Person Communications, 1995 Record., 1995 Fourth IEEE International Conference, 339-343.
(Continued)

*Primary Examiner* — Gbemileke J Onamuti
(74) *Attorney, Agent, or Firm* — Ronald O. Neerings; Charles A. Brill; Frank D. Cimino

(57) ABSTRACT

A method of transmitting a wireless signal (FIGS. 3A-3C) is disclosed. A data stream is divided (306) into a first data stream and a second data stream. The first data stream is encoded (300) at a first data rate. The second data stream is encoded (320) at a second data rate different from the first data rate. A first part of the encoded first data stream is transmitted from a first transmit antenna (308). A second part of the encoded first data stream is transmitted from a second transmit antenna (312).

47 Claims, 10 Drawing Sheets

Related U.S. Application Data continuation-in-part of application No. 10/131,742, filed on Apr. 22, 2002, now Pat. No. 7,929,631.

(60) Provisional application No. 60/678,471, filed on May 6, 2005.

(51) Int. Cl.

| | | |
|---|---|---|
| *H04W 8/30* | (2009.01) | |
| *H04J 11/00* | (2006.01) | |
| *H04B 7/06* | (2006.01) | |
| *H04B 7/08* | (2006.01) | |
| *H04L 1/00* | (2006.01) | |
| *H04B 17/336* | (2015.01) | |
| *H04B 17/382* | (2015.01) | |
| *H04L 27/26* | (2006.01) | |

(52) U.S. Cl.
CPC ......... *H04B 7/0848* (2013.01); *H04B 17/336* (2015.01); *H04B 17/382* (2015.01); *H04J 11/00* (2013.01); *H04L 1/0003* (2013.01); *H04L 1/0009* (2013.01); *H04W 8/30* (2013.01); *H04W 24/08* (2013.01); *H04B 7/0854* (2013.01); *H04L 27/2601* (2013.01)

(58) Field of Classification Search
CPC .. H04B 7/0691; H04B 7/0697; H04B 7/0848; H04B 7/0854; H04B 17/0848; H04B 17/336; H04B 17/382; H04W 24/08

See application file for complete search history.

(56) References Cited

U.S. PATENT DOCUMENTS

| | | |
|---|---|---|
| 6,178,196 B1 | 1/2001 | Naguib et al. |
| 6,317,411 B1 | 11/2001 | Whinnett et al. |
| 6,473,467 B1 | 10/2002 | Wallace et al. |
| 6,519,296 B1 | 2/2003 | Hladik |
| 6,661,856 B1 | 12/2003 | Calderbank |
| 6,834,043 B1 | 12/2004 | Vook et al. |
| 6,891,897 B1 | 5/2005 | Bevan et al. |
| 7,050,510 B2 | 5/2006 | Foschini et al. |
| 7,072,410 B1 | 7/2006 | Monsen |
| 7,339,980 B2 | 3/2008 | Grant et al. |
| 7,389,464 B2 | 6/2008 | Jeong et al. |
| 7,418,050 B1 | 8/2008 | Gardner et al. |
| 7,535,970 B2 | 5/2009 | Park et al. |
| 7,929,631 B2 * | 4/2011 | Onggosanusi ....... H04B 7/0417 375/259 |
| 8,031,801 B2 | 10/2011 | Seo et al. |
| 2003/0026349 A1 | 2/2003 | Onggosanusi et al. |
| 2004/0071158 A1 | 4/2004 | Wei |
| 2005/0157806 A1 | 7/2005 | Walton et al. |
| 2006/0212773 A1 | 9/2006 | Aytur et al. |
| 2007/0223367 A1 | 9/2007 | Wu et al. |
| 2009/0003466 A1 | 1/2009 | Taherzadehboroujeni et al. |

OTHER PUBLICATIONS

Proakis, John G., "Digital Communications", 2000, McGraw Hill, Thomas Casson, Forth Edition, pp. 494-500.

\* cited by examiner

MIMO PGRC SYSTEM AND METHOD

CROSS-REFERENCES TO RELATED APPLICATIONS

This application is a Continuation of application Ser. No. 11/418,661 filed May 5, 2006, now U.S. Pat. No. 9,270,410, which claims the benefit, under 35 U.S.C. §119(e)(1), of U.S. Provisional Application No. 60/678,471, filed May 6, 2005, and under 35 U.S.C. §120, of U.S. Nonprovisional application Ser. No. 10/131,742, now U.S. Pat. No. 7,929,631, filed Apr. 22, 2002, and issued Apr. 19, 2011, and incorporated herein in their entirety by this reference.

BACKGROUND OF THE INVENTION

The present embodiments relate to wireless communications systems and, more particularly, to Multiple-input Multiple-output (MIMO) communication with Per Group Rate Control (PGRC).

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant, or other) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip." where each chip corresponds to an element in the CDMA code. Thus, the chip frequency defines the rate of the CDMA code. WCDMA includes alternative methods of data transfer, one being frequency division duplex (FDD) and another being time division duplex (TDD), where the uplink and downlink channels are asymmetric for FDD and symmetric for TDD. Another wireless standard involves time division multiple access (TDMA) apparatus, which also communicate symbols and are used by way of example in cellular systems. TDMA communications are transmitted as a group of packets in a time period, where the time period is divided into time slots so that multiple receivers may each access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

Referring to FIG. 4, there is a wireless communication system or the prior art including a transmitter and user equipment 450-454. The transmitter includes a separate buffer 440-444 for each respective user equipment 450-454. Data from these buffers is applied to serial-to-parallel converter circuit 410. The serial-to-parallel circuit 410 converts the serial data streams into parallel data words which are then applied to modulation code scheme (MCS) circuits 400 and 404. The modulation code scheme circuits 400 and 404 transmit the signals via respective antennas 402 and 406 to user equipment within the wireless system. For example, a signal 462 from antenna 402 is transmitted to UE 1 450. Likewise, a signal 468 is transmitted from antenna 406 to UE 3 454. Antennas 402 and 406, however, also transmit respective interference signals 466 and 464. These interference signals degrade the intended data signal at the user equipment.

Wireless communications are also degraded by the channel effect. For example, the transmitted signals 462 and 468 in FIG. 4 are likely reflected by objects such as the ground, mountains, buildings, and other things that it contacts. Thus, when the transmitted communication arrives at the receiver, it has been affected by the channel effect as well as interference signals. Consequently, the originally-transmitted data is more difficult to decipher. Various approaches have been developed in an effort to reduce or remove the channel effect from the received signal so that the originally-transmitted data is properly recognized. In other words, these approaches endeavor to improve signal-to-interference+ noise ratio (SINR), thereby improving other data accuracy measures (e.g., bit error rate (BER), frame error rate (FER), and symbol error rate (SER)).

One approach to improve SINR is referred to in the art as antenna diversity, which refers to using multiple antennas at the transmitter, receiver, or both. For example, in the prior art, a multiple-antenna transmitter is used to transmit the same data on each antenna where the data is manipulated in some manner differently for each antenna. One example of such an approach is space-time transmit diversity (STTD). In STTD, a first antenna transmits a block of two input symbols over a corresponding two symbol intervals in a first order while at the same time a second antenna transmits, by way of example, the complex conjugates of the same block of two symbols and wherein those conjugates are output in a reversed order relative to how they are transmitted by the first antenna and the second symbol is a negative value relative to its value as an input.

Another approach to improve SINR combines antenna diversity with the need for higher data rate. Specifically, a Multiple-input Multiple-output (MIMO) system with transmit diversity has been devised, where each transmit antenna transmits a distinct and respective data stream. In other words, in a MIMO system, each transmit antenna transmits symbols that are independent from the symbols transmitted by any other transmit antennas for the transmitter and, thus, there is no redundancy either along a single or with respect to multiple of the transmit antennas. The advantage of a MIMO scheme using distinct and non-redundant streams is that it can achieve higher data rates as compared to a transmit diversity system.

Communication system performance demands in user equipment, however, are often dictated by web access. Applications such as news, stock quotes, video, and music require substantially higher performance in downlink transmission than in uplink transmission. Thus, MIMO system performance may be further improved for High-Speed Downlink Packet Access (HSDPA) by Orthogonal Frequency Division Multiplex (OFDM) transmission. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols.

The frequency domain tones at either edge of the band may be set to zero and are called guard tones. These guard tones allow the OFDM signal to fit into an appropriate spectral mask. Some of the frequency domain tones are set to values which will be known at the receiver, and these tones are termed pilot tones or symbols. These pilot symbols can be useful for channel estimation at the receiver. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to an RF frequency and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered. A parallel-to-serial converter is applied, and the data is sent to the channel decoder. Just as with HSDPA, OFDM communications may be performed in an FDD mode or in a TDD mode.

One approach to improve spatial diversity of a multipath channel for MIMO communications systems is the vertical BLAST (Bell Laboratories Layered Space Time) or V-BLAST system as shown at FIG. 1. The V-BLAST system uses a vertically layered space-time architecture as described by Wolniansky et al., "V-BLAST: An Architecture for Realizing Very High Data Rates Over the Rich-Scattering Wireless Channel" (ISSSE, October 1998) and by Wolniansky et al., "Detection algorithm and initial laboratory results using V-BLAST space-time communication architecture" (IEEE Vol. 35, No. 1, January 1999). The modulation code scheme (MCS) of the V-BLAST circuit includes encoder 100, interleaver 102, and symbol mapper 104. Encoder 100 of the V-BLAST system encodes a serial data stream which is subsequently applied to interleaver circuit 102. The resulting interleaved data is then applied to symbol mapper 104 to produce a desired symbol constellation. The resulting symbols are then applied to serial-to-parallel circuit 106 and transmitted to remote user equipment via antennas 108. The V-BLAST system, therefore, improves communication with a single MCS by dividing a data stream into sub-streams that propagate differently over the wireless channel. The improvement, however, depends on the relative independence of these sub-streams. When there is a high correlation between the sub-streams, data may not be properly detected at the remote user equipment.

A further improvement over the V-BLAST system is shown in the per antenna rate control (PARC) circuit of FIG. 2. The PARC circuit includes four separate MCS circuits. Each MCS circuit includes an encoder 200, and interleaver 202, and a symbol mapper 204. The serial-to-parallel circuit 206 divides a data stream into four separate sub-streams. Each sub-stream is applied to a respective encoder circuit 200. Each encoder preferably allocates a different data rate according to the channel quality of each corresponding transmit antenna 208. For CDMA applications, each encoder circuit 200 may also multiply each sub-stream by a spreading code corresponding to the intended user equipment. The encoded sub-streams are subsequently interleaved, symbol mapped, and transmitted over transmit antennas 208. The PARC system, therefore, improves communication by dividing a data stream into sub-streams that propagate differently over the wireless channel and allocating specific data rates to each sub-stream corresponding to the quality of the respective wireless channel. The improvement, however, significantly increases signal processing complexity. A separate MCS circuit is required for each respective transmit antenna. Moreover, remote PARC receivers must identify and report the SINR for each transmit antenna.

While the preceding approaches provide steady improvements in wireless communications, the present inventors recognize that still further improvements may be made, including by addressing some of the drawbacks of the prior art. In particular, embodiments of the present invention improve communication quality and significantly reduce signal processing complexity compared to the PARC system. Some of these issues are described in co-pending U.S. patent application Ser. No. 10/230,003, filed Aug. 28, 2002, entitled, "MIMO HYBRID-ARQ USING BASIS HOPPING", and incorporated herein by reference. In this referenced application, multiple independent streams of data are adaptively transmitted with a variable basis selected to improve signal quality. Further, a receiver is provided that decodes the transmitted signals including the multipaths therein. While this improvement therefore provides various benefits as discussed in the referenced application, the inventors also recognize still additional benefits that may be achieved with such systems. Accordingly, the preferred embodiments described below are directed toward these benefits as well as improving upon the prior art.

BRIEF SUMMARY OF THE INVENTION

In a first preferred embodiment, a wireless transmitter receives a data stream for transmission. The data stream is divided into first and second data streams. The first data stream is encoded at a first data rate. The second data stream is encoded at a second data rate different from the first data rate. A first part of the encoded first data stream is transmitted from a first transmit antenna. A second part of the encoded first data stream from a second transmit antenna. A first part of the encoded second data stream is transmitted from a third transmit antenna. A second part of the encoded second data stream is transmitted from a fourth transmit antenna. In a preferred embodiment, transmitter circuitry is reduced by using two modulation code schemes for four transmit antennas.

In a second preferred embodiment, a wireless receiver receives a plurality of signals from a plurality of remote transmit antennas. The wireless receiver detects a first signal from a first group of the plurality of remote transmit antennas. Signals in the first group are encoded at a first code rate. The wireless receiver receives a second signal from a second group of the plurality of remote transmit antennas. Signals in the second group are encoded at a second code rate different from the first code rate. The wireless receiver produces a quality of signal indication for the first signal. In a preferred embodiment, receiver complexity is reduced by reporting a quality of signal for only the first group of remote transmit antennas.

Other devices, systems, and methods are also disclosed and claimed.

DETAILED DESCRIPTION OF THE INVENTION

Figure 1:
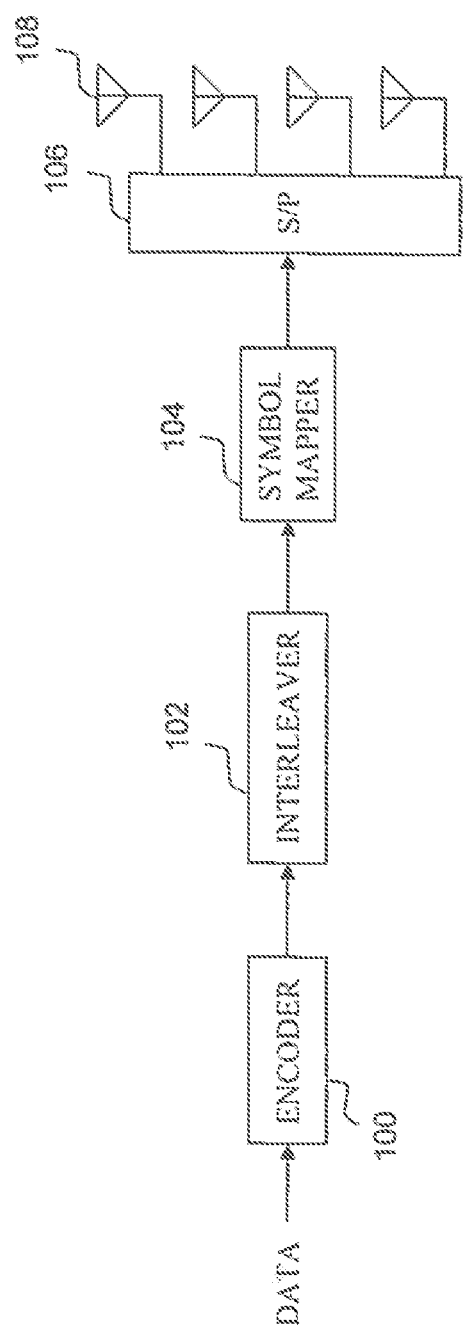
FIG. 1 is a block diagram of a V-BLAST transmitter of the prior art.
Figure 2:
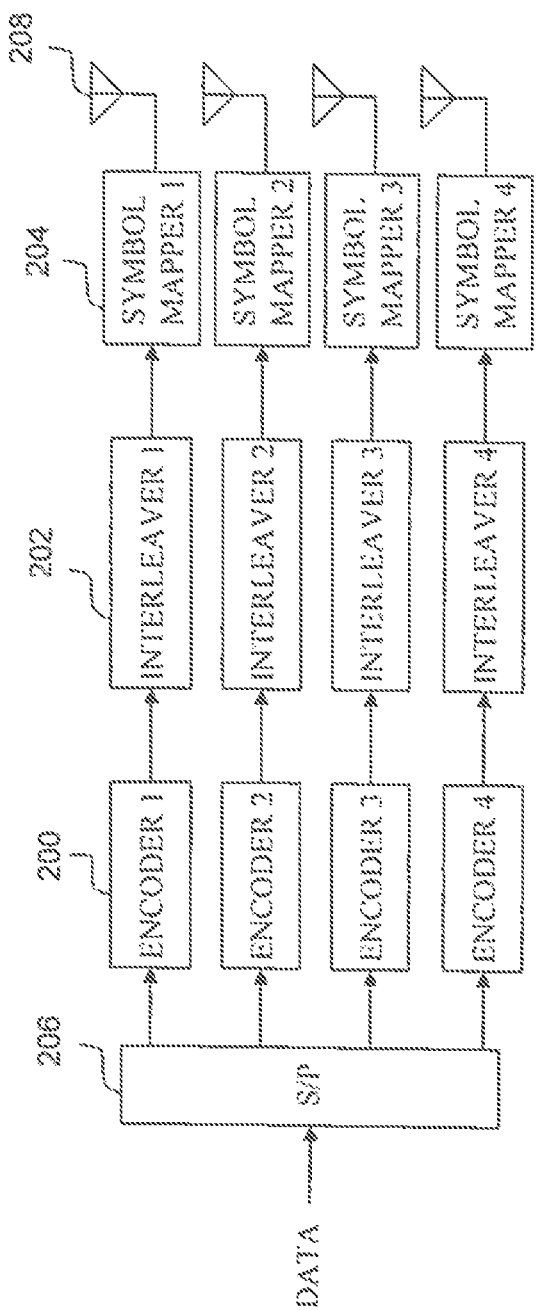
FIG. 2 is a block diagram of a PARC transmitter of the prior art.
Figure 3A:
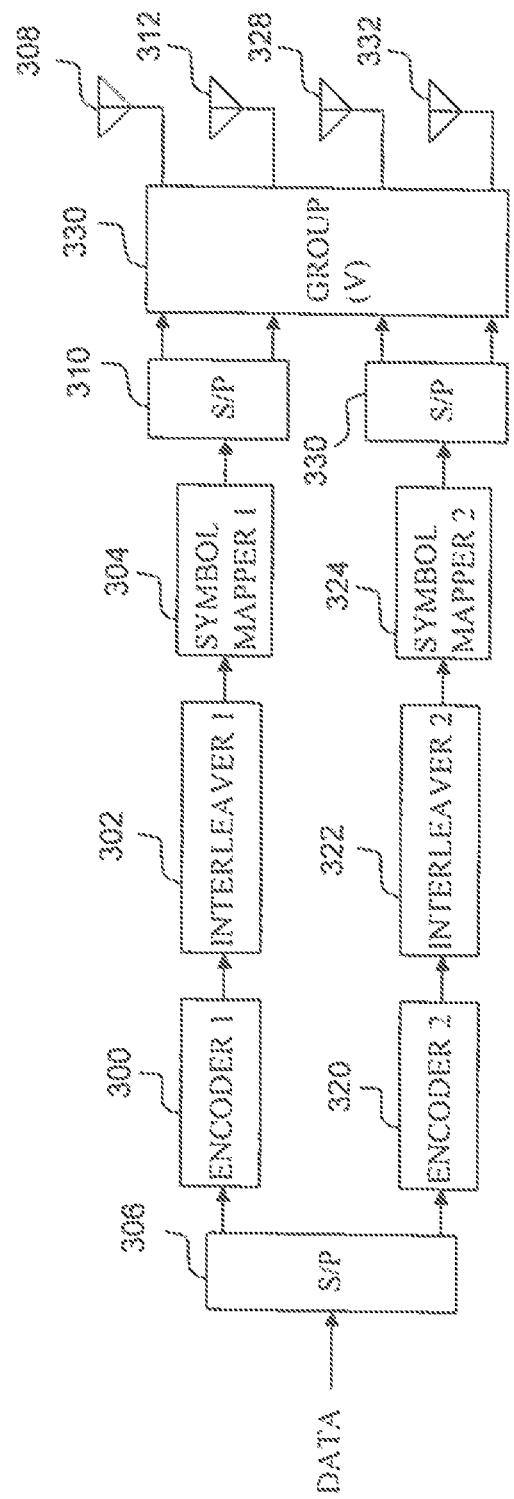
FIG. 3A is a block diagram of a first embodiment of a PGRC transmitter of the present invention.

The preferred embodiments of the present invention provide circuit simplification for a wireless communication system. The wireless communication system preferably provides for the Long Term Evolution of High-Speed Downlink Packet Access (HSDPA) and Multiple-input Multiple-output (MIMO) as will be explained in detail. A simplified block diagram of a wireless transmitter of the present invention for such a system is shown in FIG. 3A. The wireless transmitter includes two separate modulation code schemes (MCS) and four transmit antennas. Each MCS preferably includes an encoder, an interleaver, and a symbol mapper.

The wireless transmitter of FIG. 3A receives an input data stream from a baseband processor (not shown). This data stream may include pilot signals, control signals, and data signals for synchronization and control of remote wireless user equipment (UE). The data stream is divided into first and second data streams by serial-to-parallel circuit 306. Both first and second data streams are separately encoded based on channel quality information (CQI). The particular code may be a low density parity code, turbo code, Hamming code, Reed Solomon code, or other code as is known in the art. Moreover, the particular code may be different for each encoder 300 and 320. The CQI corresponding to each encoder 300 and 320 is preferably fed back from a remote UE in a previous communication. A particular code rate for each encoder is selected to reduce data errors and minimize retransmission of data. In general, a code rate of N/M indicates that N input data bits produce M encoded output data bits. In practical wireless communication systems, the code rate may vary from 1/8 for low CQI to 5/6 for high CQI. The first data stream is encoded at a first data rate by encoder 300. The second data stream is encoded at a second data rate by encoder 320. Interleavers 302 and 322 interleave their respective encoded data streams which are then applied to respective symbol mappers 304 and 324. The symbol mappers convert the interleaved data streams to respective symbol constellations. These symbol constellations may be, for example, QPSK (2 bit), 16-QAM (4 bit), or 64-QAM (16 bit). An appropriate symbol constellation is preferably selected in response to the CQI. For a low CQI, the symbol mapper may produce a QPSK symbol. Alternatively, for a high CQI, the symbol mapper may produce a 64-QAM symbol.

Data symbols from symbol mapper 304 are applied to serial-to-parallel circuit 310 to produce two parallel symbol streams. Likewise, data symbols from symbol mapper 324 are applied to serial-to-parallel circuit 330 to produce two parallel symbol streams. These four parallel symbol streams are applied to group circuit 330. Group circuit 330 then applies the parallel symbol streams having the highest data rate to the two best transmit antennas having the highest CQI. Group circuit 330 applies the remaining parallel symbol streams having the lowest data rate to the remaining two transmit antennas having the lowest CQI. The MCS with maximum data throughput or code rate, therefore, is applied to the transmit antennas having the best CQI. The MCS with a lesser data throughput or code rate is applied to the transmit antennas having a lesser CQI. Alternative grouping schemes, such as strong and weak transmit antennas, necessarily limit data throughput of each MCS to that of the weakest transmit antenna having the minimum CQI. In a preferred embodiment of the present invention, group circuit 330 also pre-codes the parallel symbol streams. Pre-coding preferably multiplies each symbol stream by a matrix V to correct or counteract the anticipated channel gain and rotation prior to transmission. The matrix V can be unitary or non-unitary. Here, a square matrix is unitary when the conjugate transpose $V^H$ is equal to the matrix inverse $V^{-1}$. When V is unitary, V may be generated using Givens or Householder constructions. In a preferred embodiment of the present invention, matrix V of group circuit 330 is unitary. The anticipated channel rotation or an indication of the chosen matrix V is preferably fed back from a remote UE together with CQI. The present invention, therefore, advantageously tailors each MCS code rate and symbol mapping scheme to the CQI for respective transmit antennas. Moreover, circuit complexity is reduced by half as compared to 4-antenna PARC circuits of the prior art while providing approximately the same performance as will be explained in detail.

Figure 3B:
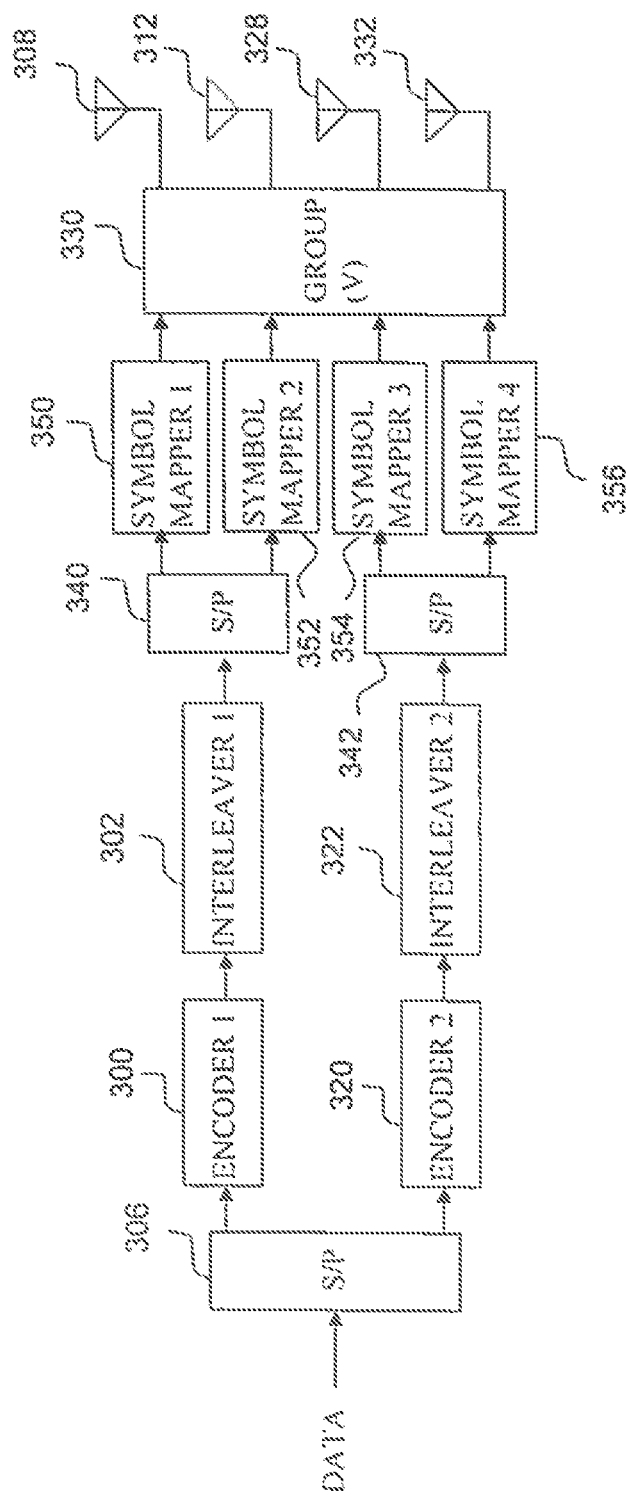
FIG. 3B is a block diagram of a second embodiment of a PGRC transmitter of the present invention.

Turning now to FIG. 3B, there is another embodiment of a transmitter of the present invention. Like numbered circuit blocks perform substantially the same functions as previously described with regard to the transmitter of FIG. 3A. However, interleaved data streams from blocks 302 and 322 are applied directly to serial-to-parallel circuits 340 and 342, respectively. Each serial-to-parallel circuit produces two parallel interleaved data streams. The two parallel data streams from serial-to-parallel circuit 340 are applied to symbol mapper circuits 350 and 352. Likewise, the two parallel data streams from serial-to-parallel circuit 342 are applied to symbol mapper circuits 354 and 356. Each of symbol mapper circuits 350-356 may produce any combination of symbol constellations. Thus, each MCS of FIG. 3B may advantageously produce two different code rates as well as two different symbol constellations for each respective code rate. The additional symbol mapper circuits, therefore, advantageously provide a finer resolution of data throughput in response to the CQI than the circuit of FIG. 3A for slightly greater circuit complexity.

Figure 3C:
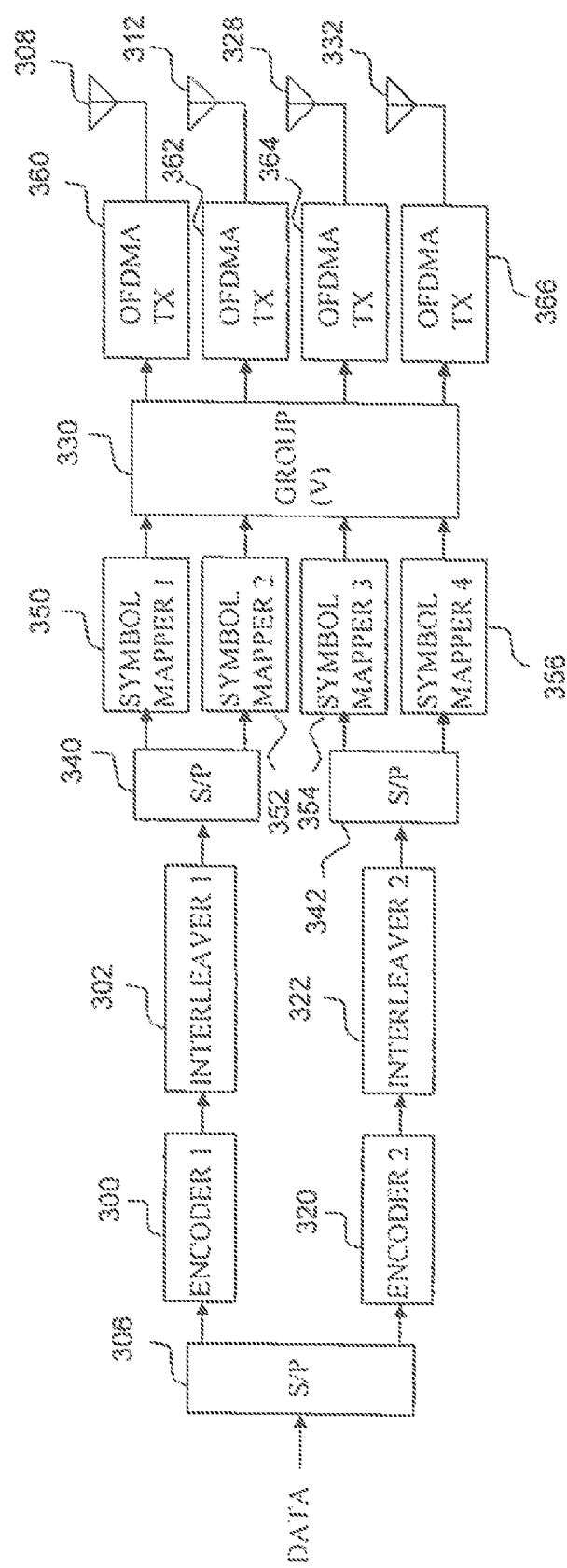
FIG. 3C is a block diagram of a third embodiment of a PGRC transmitter of the present invention adapted for OFDM transmission.
Figure 4:
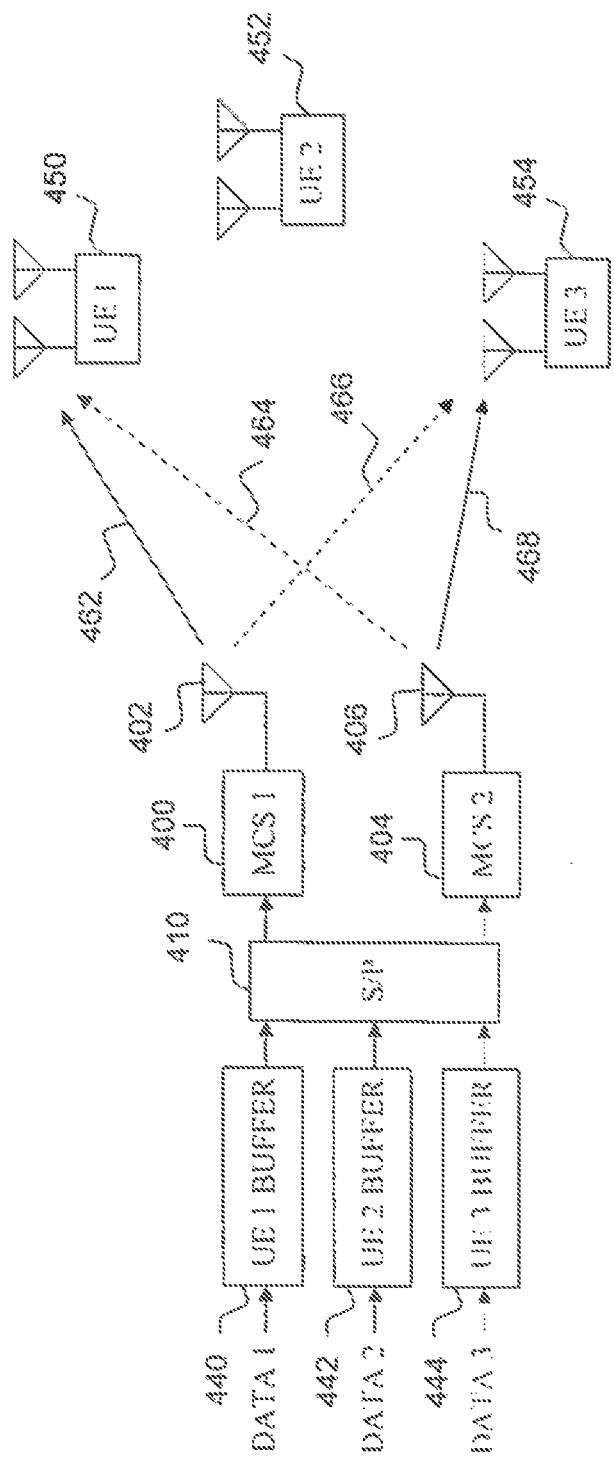
FIG. 4 is a simplified block diagram of a multiuser PARC wireless communication system of the prior art.

Referring now to FIG. 3C, there is another embodiment of the present invention. Like numbered circuit blocks perform similar functions as previously described with regard to the transmitter of FIG. 3B. Orthogonal frequency division multiplex (OFDM) transmitters 360-366 are added to transmit OFDM symbols from respective transmit antennas 308, 312, 328, and 332. Symbol mapper circuits 350-356 receive respective data streams from serial-to-parallel converter circuits 340 and 342 and produce frequency domain data symbols. Group circuit 330 then applies the frequency domain data symbols having the highest data rate to the OFDM transmitters corresponding to the two best transmit antennas having the highest CQI. The remaining frequency domain data symbols having the lowest data rate are applied to the remaining OFDM transmitters corresponding to the two transmit antennas having the lowest CQI. An inverse fast Fourier transform (IFFT) converts the frequency domain data symbols into time domain waveforms. The IFFT structure allows the frequency tones to be orthogonal. The OFDM symbols are upconverted to RF and transmitted by respective OFDM transmitters 360-366 on multiple carriers that are spaced apart to provide orthogonality. The present invention, therefore, advantageously provides two MCS data rates and four selectable symbol mapper circuits for maximum data throughput. Furthermore, the present invention is compatible with OFDM transmission.

Figure 5:
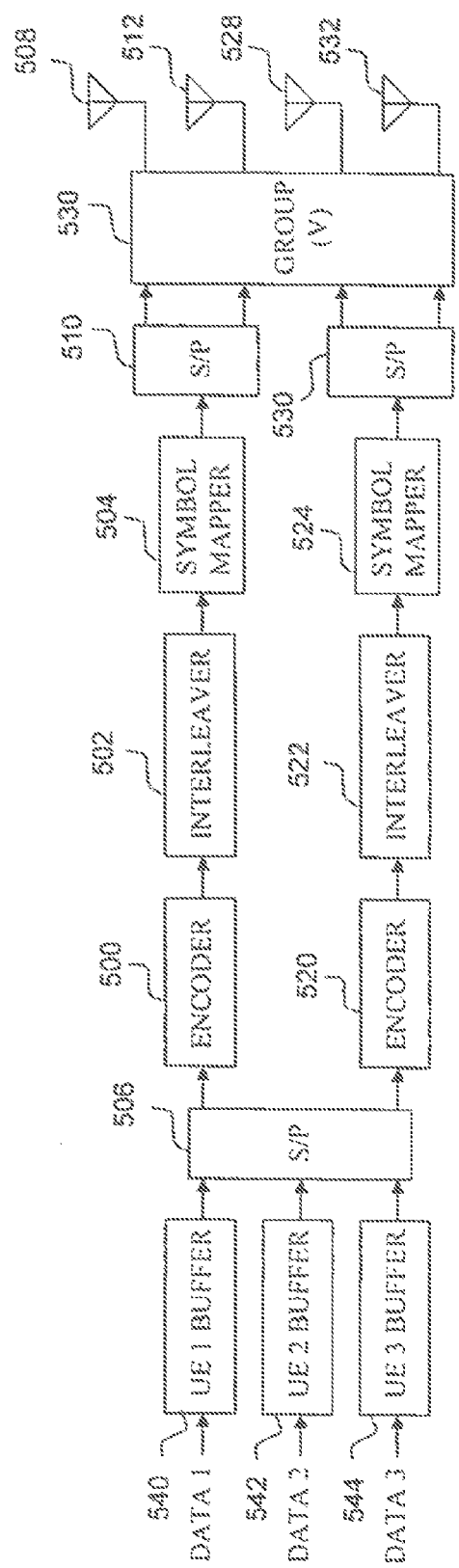
FIG. 5 is a block diagram of a PGRC transmitter as in FIG. 3A for multiuser transmission.

Referring now to FIG. 5, there is yet another embodiment of the present invention adapted to multiuser transmission. The wireless transmitter of FIG. 5 receives multiple data input streams from user buffers 540-544. Data from these input buffers is applied to serial-to-parallel circuit 506 and divided into first and second data streams. The first data stream is applied to the upper MCS including encoder 500, interleaver 502, and symbol mapper 504. The second data stream is applied to the lower MCS including encoder 520, interleaver 522, and symbol mapper 524. Both first and second data streams are separately encoded based on channel quality information (CQI) as previously described with regard to FIG. 3A. For the multiuser case, however, a single MCS may be assigned to a user with higher data throughput requirements. Other users with lower throughput requirements may be assigned to the remaining MCS. For example, UE 1 buffer 504 may be sending High-Speed Downlink Packet Access (HSDPA). UE 2 542 and UE 3 544 may be sending voice, stock quotes, or other low speed data. UE 1 buffer 540 is preferably assigned to the upper MCS, and UE 2 542 and UE 3 544 buffers are assigned to the lower MCS. Each encoder is 500 and 520 selects a code rate compatible with the CQI. Interleavers 502 and 522 interleave their respective encoded data streams which are then applied to respective symbol mappers 504 and 524. The symbol mappers convert the interleaved data streams to respective symbol constellations. These symbol constellations may be, for example, QPSK (2 bit), 16-QAM (16 bit), or 64-QAM (64 bit). An appropriate symbol constellation is preferably selected in response to the CQI as previously described with respect to FIG. 3A.

Data symbols from symbol mappers 504 and 524 are applied to serial-to-parallel circuits 510 and 530, respectively, to produce four parallel symbol streams. These four parallel symbol streams are applied to group circuit 530. Group circuit 530 then applies the parallel symbol streams having the highest data rate to the two best transmit antennas having the highest CQI. Group circuit 530 applies the remaining parallel symbol streams having the lowest data rate to the remaining two transmit antennas having the lowest CQI. The MCS with maximum data throughput or code rate, therefore, is applied to the transmit antennas having the best CQI. The MCS with a lesser data throughput or code rate is applied to the transmit antennas having a lesser CQI. In a preferred embodiment of the present invention, group circuit 530 also pre-codes the parallel symbol streams as previously described. Pre-coding multiplies each symbol stream by a matrix V to correct or counteract the anticipated channel gain and rotation prior to transmission. The matrix V can be unitary or non-unitary. When V is unitary, V may be generated using Givens or Householder constructions. In a preferred embodiment of the present invention, matrix V of group circuit 330 is unitary. The anticipated channel rotation or an indication of the chosen matrix V is preferably fed back from a remote UE together with CQI. The present invention, therefore, advantageously tailors each MCS code rate and symbol mapping scheme to the CQI for respective transmit antennas. MCS allocation is determined by data throughput requirements for each UE. Moreover, circuit complexity is reduced by half as compared to 4-antenna PARC circuits of the prior art while providing approximately the same performance.

Figure 6A:
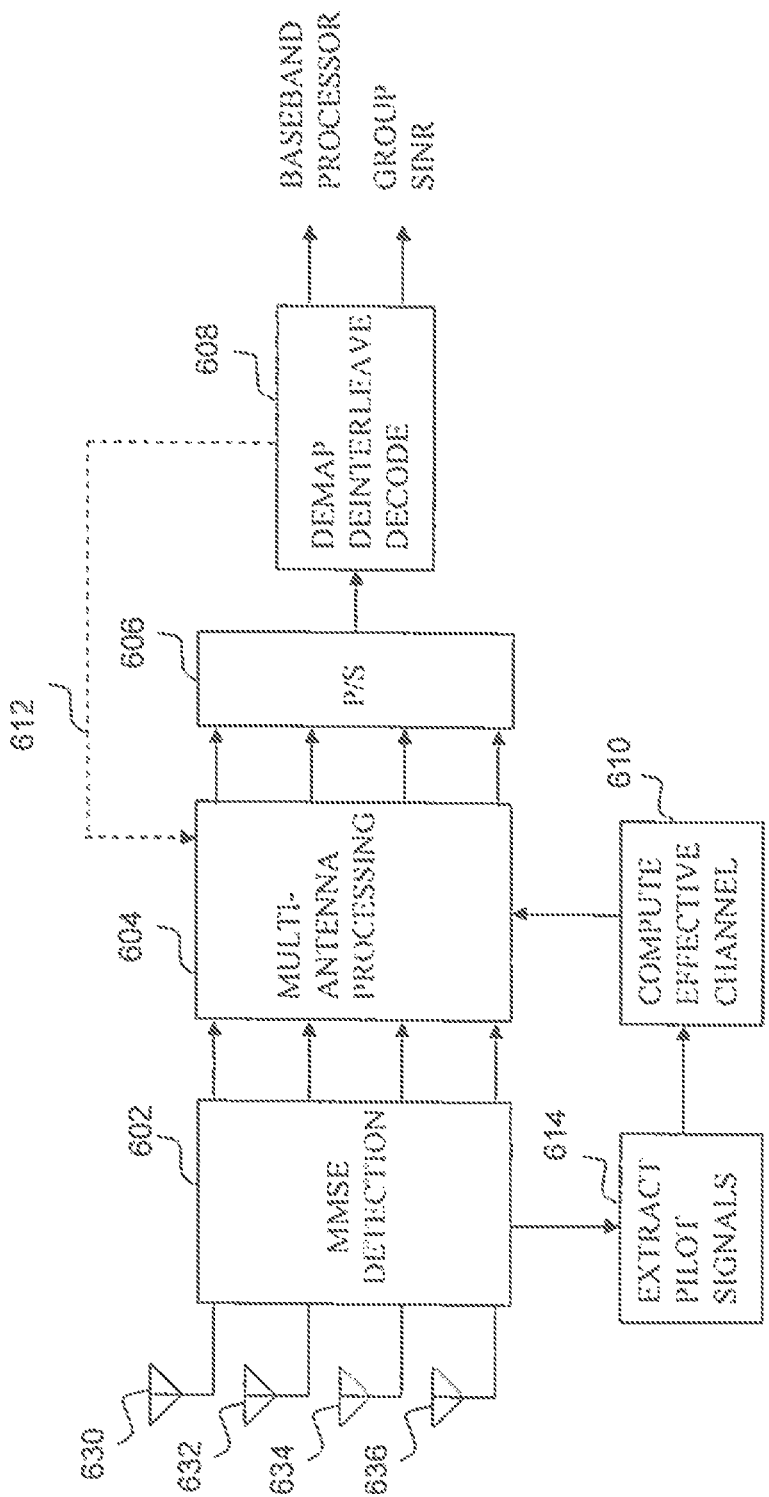
FIG. 6A is a block diagram of a PARC receiver of the present invention.

Referring to FIG. 6A, there is a simplified block diagram of a wireless receiver of the present invention. Inventive features of the previously described transmitters of the present invention are included in the receiver for compatibility. Antennas 630-636 receive signals from a remote transmitter. In a preferred embodiment, there are two, four, or more antennas 630-636. Received signals at each antenna 630-636 include signals from each transmit antenna of a remote transmitter. For example, antenna 630 receives signals from transmit antennas 308-332 (FIG. 3A) in a single user environment. Antenna 630 also receives signals from transmit antennas 508-532 (FIG. 5) in a multiuser environment. However, in the multiuser environment, signals from transmit antenna 508 may be intended for the receiver of FIG. 6A while signals from transmit antennas 512-532 may be interference. Received signals from antennas 630-636 are applied to Mean Minimum Square Error (MMSE) detection circuit 602. The MMSE detection circuit detects user data streams from receive antennas 630-636. Alternative detection circuits utilizing match filter, zero forcing, or least square algorithms as are known in the art may also be used in lieu of MMSE detection. For CDMA applications, the received signals may be despread with user-specific spreading codes. Circuit 614 extracts pilot signals from these user data streams. These pilot signals may have a power boost relative to data signals. The extracted pilot signals are applied to circuit 610 to compute an effective channel matrix representing the channel effect between the receiver and remote transmitter. The outputs of the MMSE detection circuit 602 are applied to the multi-antenna processing circuit 604 and corrected by the effective channel matrix from circuit 610. Different types of multi-antenna processing can be used such as linear, decision feedback, or maximum likelihood. These signals are subsequently converted to a serial data stream by parallel-to-serial converter 606. The serial data stream is then demapped, deinterleaved, and, decoded in circuit 608 and applied to a baseband processor (not shown). An optional feedback loop 612 from circuit 608 to circuit 604 allows a decision feedback operation which can improve the estimation of data bits. The decision feedback operation may include successive interference cancellation (SIC) wherein each detected signal is successively removed from the composite received signal.

Circuit 608 also calculates a group SINR from the received signal which is subsequently retransmitted to the remote transmitter as a CQI. The group SINR corresponds to a particular transmitter MCS that produced the intended user signal. In a single user environment, the receiver preferably reports an SINR for each MCS of the transmitter of FIG. 3A. By way of contrast, MIMO receivers of the prior art are required to report a separate SINR for each transmit antenna of a PARC transmitter. Thus, the present invention advantageously reduces the SINR reporting overhead by half in a single user environment. Alternatively, for a multiuser environment, the receiver of FIG. 6A reports a single SINR for the remote transmitter MCS producing the intended user data stream.

Figure 6B:
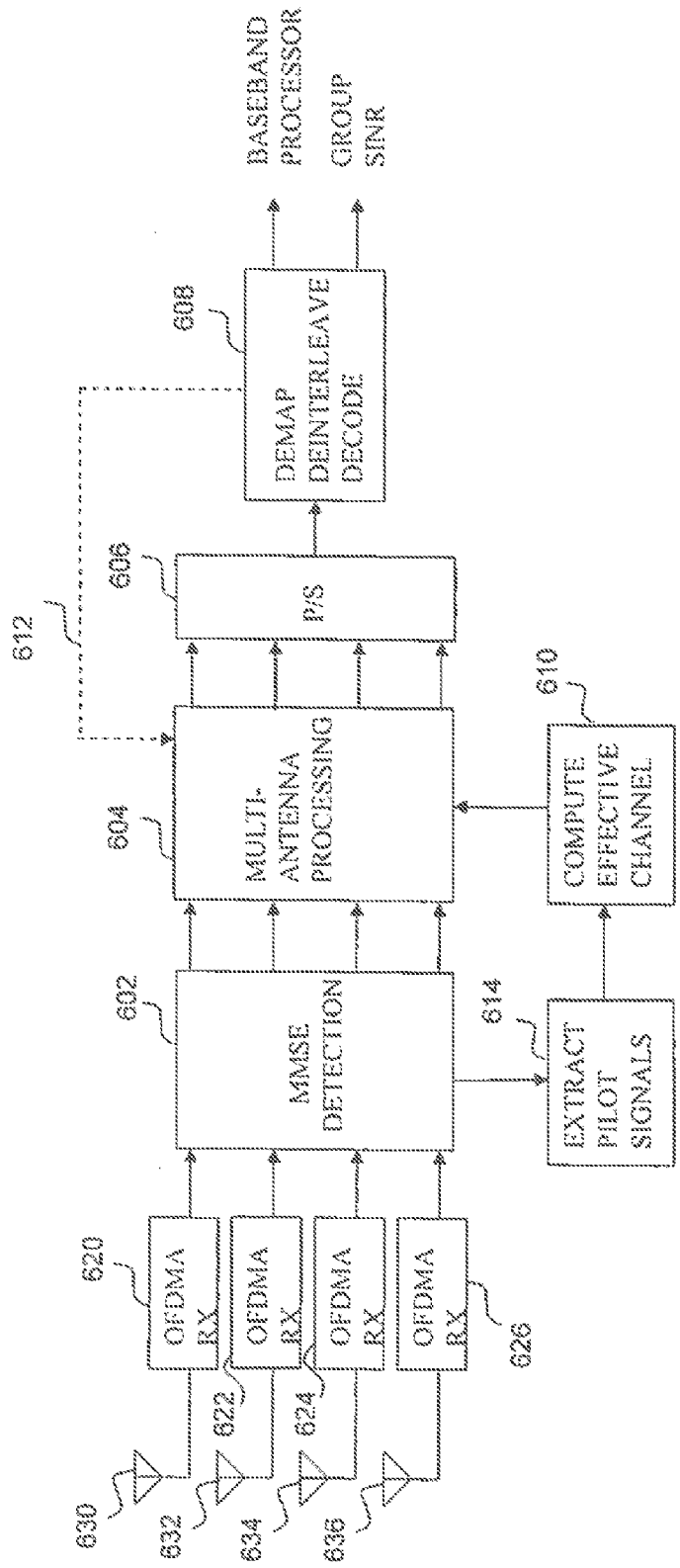
FIG. 6B is a block diagram of a PARC receiver of the present invention adapted for OFDM reception.

Referring now to FIG. 6B, there is a simplified block diagram of another embodiment of a wireless receiver of the present invention. Like numbered circuit blocks perform substantially the same functions as previously described with regard to the receiver of FIG. 6A. Antennas 630-636 receive signals from a remote transmitter. In a preferred embodiment, there are two, four, or more antennas 630-636. Received signals at each antenna 630-636 include signals from each transmit antenna of a remote transmitter as previously described. These received signals are applied to respective OFDM receiver circuits 620-626. The OFDM circuits perform an FFT on each OFDM data stream to convert received signals to a stream of OFDM signals or tones in the frequency domain. The OFDM tones are applied to Mean Minimum Square Error (MMSE) detection circuit 602. As with the circuit of FIG. 6A, alternative detection circuits utilizing match filter, zero forcing, or least square algorithms as are known in the art may also be used in lieu of MMSE detection. The MMSE detection circuit detects user data streams from OFDM receivers 620-626. Circuit 614 extracts pilot tones from these user data streams. The extracted pilot tones are applied to circuit 610 to compute the effective channel matrix between the receiver and remote transmitter. The outputs of the MMSE detection circuit 602 are applied to the multi-antenna processing circuit 604 and corrected by the effective channel matrix from circuit 610. Different types of multi-antenna processing can be used such as linear, decision feedback, or maximum likelihood. These signals are subsequently converted to a serial data stream by parallel-to-serial converter 606. The serial data stream is then demapped, deinterleaved, and, decoded in circuit 608 and applied to a baseband processor. As previously described, an optional feedback loop 612 from circuit 608 to circuit 604 allows a decision feedback operation which can improve the estimation of data bits. The decision feedback operation may include successive interference cancellation (SIC) wherein each detected signal is successively removed from the composite received signal.

Figure 7B:
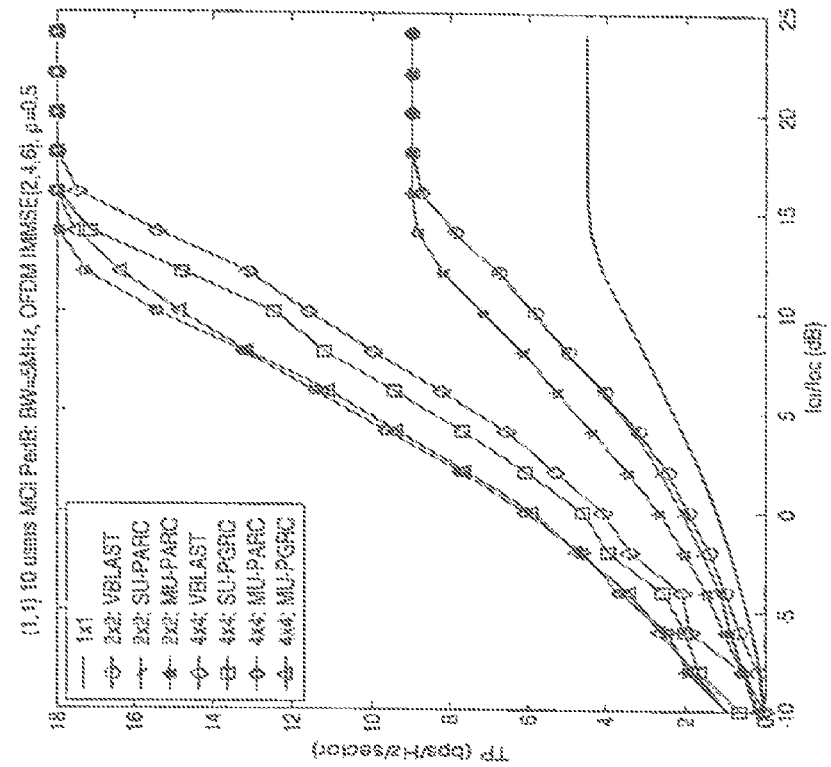
FIGS. 7A and 7B are simulations of the present invention, V-BLAST, and PARC for zero channel correlation and 50% channel correlation, respectively.
Figure 7A:
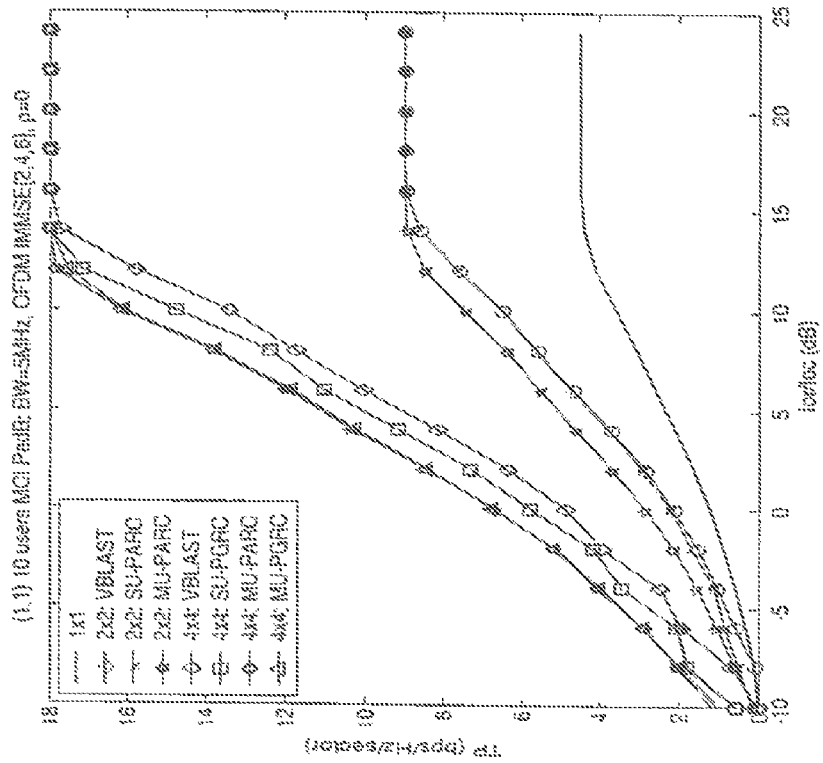

Referring now to FIGS. 7A and 7B there are simulations of the present invention and circuits of the prior art. The simulation of FIG. 7A is based on a spatial correlation value of zero (p=0). This represents an ideal case of orthogonal signals where a receiver correctly identifies each signal from each transmit antenna. The simulation of FIG. 7A is based on a spatial correlation value of zero (p=0). By way of comparison, the simulation of FIG. 7B represents a worst case where received signals correlate 50% of the time (p=0.5). Both simulations assume a 10 user scheduler maximum carrier-to-interference (MCI) ratio, a low doppler rate, and 5 MHz channel bandwidth for OFDM transmission with iterative MMSE detection. The vertical axis of each simulation is throughput in units of bits-per-second/Hz/sector. The horizontal axis is a ratio of received signal power (IOR) to total channel power (IOC) in dB. This is comparable to a SINR as previously described. In view of the foregoing, only the curves of FIG. 7A will be described in detail.

The simulation of FIG. 7A includes eight curves. Numbers in the legend indicate a number of transmit and receive antennas, respectively, in the communication system. For example, the 1×1 curve indicates a prior art communication system with a single transmit antenna and a single receive antenna. This curve establishes a baseline for comparison of performance of the present invention with circuits of the prior art. The 1×1 curve increases throughput from 0 to 4.5 with IOR/IOC increasing from −10 dB to 15 dB. No substantial improvement is seen for values of IOR/IOC above 15 dB for this curve or any of the other seven curves. A second group of 2×2 curves shows a significant improvement over the 1×1 curve. This second group includes V-BLAST (2×2 VBLAST), single user PARC (2×2 SU-PARC), and multiuser PARC (2×2 MU-PARC). The second group approximately doubles the throughput of the 1×1 system to 9.0 at 15 dB. The multiuser (2×2 MU-PARC) shows a slight advantage in throughput over the other two systems. A third group of 4×4 curves shows a significant improvement over the 1×1 curve and the second group of 2×2 curves. This third group includes V-BLAST (4×4 VBLAST), single user PGRC (4×4 SU-PGRC), multiuser PARC (4×4 MU-PARC), and multiuser PGRC (4×4 MU-PGRC). The third group approximately doubles the throughput of the 2×2 system to 18.0 at 15 dB. The multiuser (4×4 MU-PGRC) shows a consistent advantage in throughput over the single user (4×4 SU-PGRC) system. However, performance of the multiuser PGRC (4×4 MU-PGRC) system of the present invention is virtually identically to the multiuser PARC (4×4 MU-PARC) system of the prior art throughout the simulation range. Thus, the present invention greatly simplifies circuit complexity and reduces uplink SINR reporting relative to PARC systems of the prior art while offering virtually identical throughput.

Still further, while numerous examples have thus been provided, one skilled in the art should recognize that various modifications, substitutions, or alterations may be made to the described embodiments while still falling with the inventive scope as defined by the following claims. For example, the present invention may be applied to any number of antennas greater than four. When 6 antennas are present, they may be grouped into 3 groups of 2 antennas each or 2 groups of 3 antennas each. Likewise, when 8 antennas are present, they may be grouped into 2 groups of 4 antennas each or 4 groups of 2 antennas each. Other combinations will be readily apparent to one of ordinary skill in the art having access to the instant specification.

What is claimed is:

1. A method of transmitting a wireless signal from a wireless transmitter, comprising the steps of:
    receiving two data streams;
    encoding the first data stream in response to a first channel quality indication;
    encoding the second data stream separately from the first data stream in response to a second channel quality indication;
    converting a first part of the encoded first data stream to a first symbol;
    converting a second part of the encoded first data stream to a second symbol;
    multiplying the encoded first and second symbols by a linear basis matrix to produce first and second product symbols; and
    transmitting the product symbols from at least two transmit antennas of the wireless transmitter.

2. The method of claim 1, comprising the steps of:
    converting a first part of the encoded second data stream to a third symbol;
    converting a second part of the encoded second data stream to a fourth symbol;
    multiplying the encoded third and fourth symbols by the linear basis matrix to produce third and fourth product symbols; and
    transmitting the third and fourth product symbols from the at least two transmit antennas.

3. The method of claim 1, wherein the linear basis matrix is unitary.

4. The method of claim 1, wherein the linear basis matrix is non-unitary.

5. The method of claim 1, wherein at least one of the encoded first and second data steams comprise orthogonal frequency division multiplex (OFDM) symbols.

6. The method of claim 1, wherein the data stream comprises data for at least two different wireless receivers.

7. The method of claim 1, wherein the data stream comprises data for a single wireless receiver.

8. A wireless transmitter, comprising:
a first circuit arranged to process two data streams;
a first encoder circuit arranged to encode the first data stream at a first data rate;
a second encoder circuit arranged to encode the second data stream at a second data rate greater than the first data rate;
a first symbol mapper arranged to produce a first and a second symbol from the first data stream;
a second symbol mapper arranged to produce a third and a fourth symbol from the second data stream; and
a circuit arranged to multiply the encoded first, second, third, and fourth symbols by a linear basis matrix to produce a plurality of product symbols.

9. The wireless transmitter of claim 8, comprising applying the plurality of product symbols to a plurality of transmit antennas.

10. The wireless transmitter of claim 9, wherein the data stream comprises data for at least two different wireless receivers.

11. The wireless transmitter of claim 9, comprising more than four transmit antennas.

12. The wireless transmitter of claim 8, wherein each of the first and second data rates is selected in response to a channel quality indication.

13. The wireless transmitter of claim 8, comprising:
a first interleaver circuit arranged to interleave the first data stream; and
a second interleaver circuit arranged to interleave the second data stream.

14. The wireless transmitter of claim 8, wherein the group circuit applies the plurality of product symbols to a plurality of transmit antennas.

15. The wireless transmitter of claim 8, wherein the linear basis matrix is unitary.

16. The wireless transmitter of claim 8, wherein the linear basis matrix is non-unitary.

17. The wireless transmitter of claim 8, wherein the symbols comprise orthogonal frequency division multiplex (OFDM) symbols.

18. The wireless transmitter of claim 8, wherein the data stream comprises data for a single wireless receiver.

19. A method of receiving a signal at a wireless receiver, comprising the steps of:
receiving at the wireless receiver a plurality of symbols from a plurality of remote transmit antennas;
detecting the plurality of symbols;
receiving a plurality of pilot signals from the remote transmit antennas;
computing an effective channel matrix in response to the received pilot signals;
using the effective channel matrix to process a plurality of product symbols; and
decoding the plurality of product symbols.

20. The method of claim 19, wherein the step of receiving a plurality of symbols comprises receiving a plurality of symbols at a plurality of receive antennas.

21. The method of claim 20, wherein the plurality of receive antennas comprises at least four receive antennas.

22. The method of claim 20, wherein the plurality of receive antennas comprises more than four receive antennas.

23. The method of claim 19, wherein the step of detecting comprises Mean Minimum Square Error (MMSE) detection.

24. The method of claim 19, comprising producing a channel quality indication.

25. The method of claim 19, comprising the steps of:
producing a channel rotation estimate; and
transmitting the channel quality indication and the channel rotation estimate to a remote transmitter.

26. The method of claim 19, wherein the plurality of symbols comprises orthogonal frequency division multiplex (OFDM) symbols.

27. The method of claim 19, wherein the plurality of symbols comprises data for at least two different users.

28. The method of claim 19, wherein the plurality of symbols comprises data for a single user.

29. A wireless transmitter apparatus, comprising:
circuitry for receiving two data streams;
circuitry for encoding the first data stream in response to a first channel quality indication;
circuitry for encoding the second data stream separately from the first data stream in response to a second channel quality indication;
circuitry for converting a first part of the encoded first data stream to a first symbol;
circuitry for converting a second part of the encoded first data stream to a second symbol;
circuitry for multiplying the encoded first and second symbols by a linear basis matrix to produce first and second product symbols; and
circuitry for transmitting the product symbols from at least two transmit antennas of the wireless transmitter.

30. The apparatus of claim 29, comprising:
circuitry for converting a first part of the encoded second data stream to a third symbol;
circuitry for converting a second part of the encoded second data stream to a fourth symbol;
circuitry for multiplying the encoded third and fourth symbols by the linear basis matrix to produce third and fourth product symbols; and
circuitry for transmitting the third and fourth product symbols from the at least two transmit antennas.

31. The apparatus of claim 29, wherein the linear basis matrix is unitary.

32. The apparatus of claim 29, wherein the linear basis matrix is non-unitary.

33. The apparatus of claim 29, wherein at least one of the encoded first and second data steams comprise orthogonal frequency division multiplex (OFDM) symbols.

34. The apparatus of claim 29, wherein the data stream comprises data for at least two different wireless receivers.

35. The apparatus of claim 29, wherein the data stream comprises data for a single wireless receiver.

36. A method of transmitting a wireless signal from a wireless transmitter, comprising the steps of:
receiving at least two transport channels;
encoding the first transport channel to produce a first codeword in response to a first channel quality indicator;
encoding the second transport channel to produce a second codeword in response to a second channel quality indicator, wherein the second encoding is done separately from the first encoding;

mapping the two codewords to two or more layers;

multiplying the layers by a linear basis matrix to produce two or more product symbols; and transmitting the product symbols from at least two transmit antennas of the wireless transmitter.

37. The method of claim 36, wherein the linear basis matrix is unitary.

38. The method of claim 36, wherein the linear basis matrix is non-unitary.

39. The method of claim 36, wherein at least one of the encoded first and second data steams comprise orthogonal frequency division multiplex (OFDM) symbols.

40. The method of claim 36, wherein the data stream comprises data for at least two different wireless receivers.

41. The method of claim 36, wherein the data stream comprises data for a single wireless receiver.

42. A wireless transmitter apparatus, comprising:

circuitry for receiving at least two transport channels;

circuitry for encoding the first transport channel to produce a first codeword in response to a first channel quality indicator;

circuitry for encoding the second transport channel to produce a second codeword in response to a second channel quality indicator, wherein the second encoding is done separately from the first encoding;

circuitry for mapping the two codewords to two or more layers;

circuitry for multiplying the layers by a linear basis matrix to produce two or more product symbols; and circuitry for transmitting the product symbols from at least two transmit antennas of the wireless transmitter.

43. The apparatus of claim 42, wherein the linear basis matrix is unitary.

44. The apparatus of claim 42, wherein the linear basis matrix is non-unitary.

45. The apparatus of claim 42, wherein at least one of the encoded first and second data steams comprise orthogonal frequency division multiplex (OFDM) symbols.

46. The apparatus of claim 42, wherein the data stream comprises data for at least two different wireless receivers.

47. The apparatus of claim 42, wherein the data stream comprises data for a single wireless receiver.

\* \* \* \* \*